(No Model.)

J. V. HARTER.
SEED DRILL ATTACHMENT.

No. 330,022.  Patented Nov. 10, 1885.

ATTEST.
J. Henry Kaiser
Geo. T. Smallwood

INVENTOR.
Joseph V. Harter
By David H. Mead
Attorney

UNITED STATES PATENT OFFICE.

JOSEPH V. HARTER, OF DENVER, ILLINOIS.

SEED-DRILL ATTACHMENT.

SPECIFICATION forming part of Letters Patent No. 330,022, dated November 10, 1885.

Application filed March 20, 1884. Renewed April 23, 1885. Serial No. 163,240. (No model.)

*To all whom it may concern:*

Be it known that I, JOSEPH V. HARTER, a citizen of the United States, residing at Denver, Hancock county, Illinois, have invented new and useful Improvements in Seed-Drill Attachments, of which the following is a specification.

My invention relates to certain new and useful improvements in attachments for seed-drills.

The objects of the improvements are to provide means for softening the soil in advance of the drill-teeth, so that the same may readily pass, and to provide a simple means for pressing the seed into the earth after being dropped into the channel formed by the teeth, so that they may not be exposed to the wind or fowls.

With these ends in view the invention consists of one or more cutting-wheels mounted in front of each drill-tooth, said wheel being mounted at an angle to the line of draft, and so arranged as to enter the ground a distance equal to the depth of mellow earth required for the free passage of the teeth; and, further, of a wheel mounted in rear of each of the teeth, the bearing-surface of which is of a contour coincident with the form of channel formed by the passage of the teeth.

In order that others skilled in the art may know how to make and use my improvements, I will now proceed to describe the same in connection with the accompanying drawings, in which—

Figure 1:
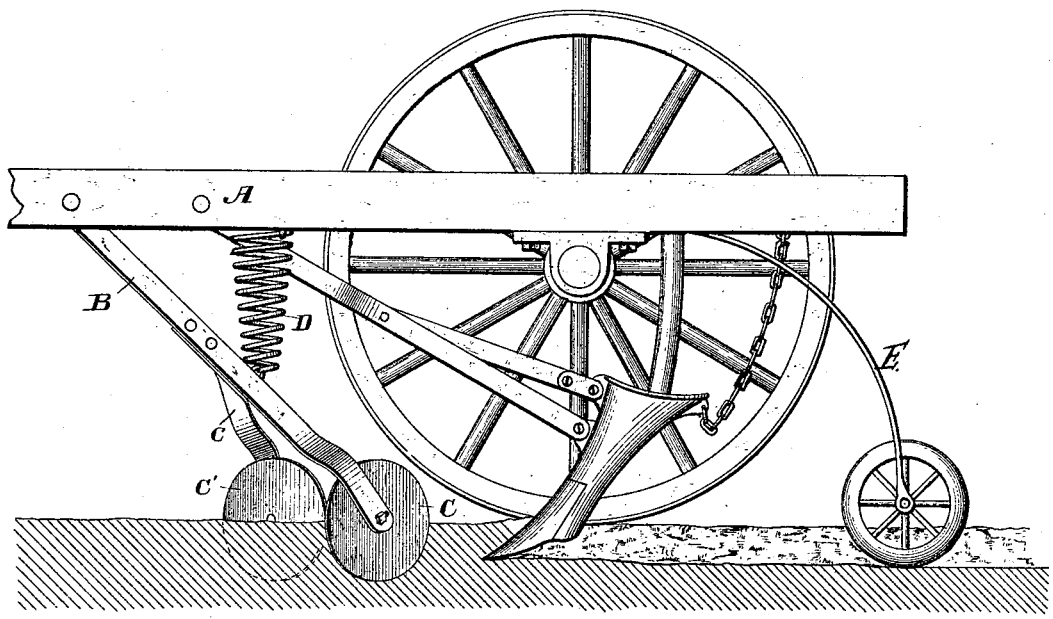
Figure 2:
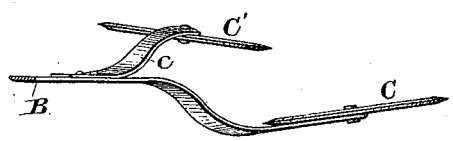
Figure 3:
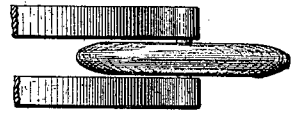

Figure 1 is a sectional side elevation of a seed-drill with all the parts removed not necessary to a full understanding of my invention. Fig. 2 is a plan view of the cutting-wheels, and Fig. 3 is a similar view of the pressing-wheel.

In the drawings, A represents one of the horizontal side beams, to which the teeth-support is fixed. To this beam I attach the upper end of a depending standard, B, to the lower end of which are attached the cutting-wheels C C', the former directly and the latter by the bent projection $c$. The lower end of the standard and the arm $c$ are so bent that the wheels mounted thereon are carried at an angle to the line of draft and to each other, in order that the ground through which they pass may be thoroughly loosened.

The wheels C C' are preferably disks of steel, and are secured to their standards by bolts or rivets.

The depending standard B is connected to the beam A by a bolt passing through each, and in a manner to allow the said standard a limited vibratory motion, in order that the lower end may be raised should the wheels come in contact with an obstruction.

The wheels are held to their work by a spring, D, the upper end of which is secured to the shaft A, and having its lower end bearing on and secured to the standard a short distance above the point at which the cutting-wheels are mounted. The strength of this spring is such as to keep the wheels in the ground; but should they come in contact with a stone it is overcome and the wheels allowed to pass over the obstruction.

E represents a curved standard secured to the beam A, the bifurcated ends of which form bearings for the axle of the wheel, the tire of which is of a shape coincident with the form of the channel formed by the passage of the drill-tooth, so that the seed deposited in said channel are pressed into the soil by the wheel in its passage.

The standard E is made of spring metal, so that should the wheel come in contact with a stone or other obstruction it may rise and pass over.

Having thus described my invention, what I claim, and desire to secure by Letters Patent, is—

1. In a seed-drill, two cutting-disks arranged at an angle to the line of draft and to each other, situated in front of each drill-tooth, for the purpose set forth.

2. The combination, with the beam A, of the depending standard B, having secured thereto the cutting-disk C and the arm $c$, carrying the cutting-disk C', the said standard and arm being formed to carry the disks at an angle to the line of draft and to each other, the whole arranged in front of a drill-tooth of a seed-drill, for the purpose set forth.

3. The combination, with the beam A, of the standard B, secured pivotally to the said beam in front of a tooth of a seed-drill, and carrying the wheels C and C', and the spring D, all arranged and operating substantially as described.

In testimony whereof I have hereunto set my hand in the presence of two subscribing witnesses.

JOSEPH V. HARTER.

Witnesses:
A. B. BROWNE,
AUGUSTA F. MEAD.